Sept. 13, 1960 H. W. TRECHSEL 2,952,500
ANALOG SIMILATOR
Filed June 20, 1956 4 Sheets-Sheet 1

INVENTOR.
Hans Werner Trechsel
BY
ATTORNEYS.

Sept. 13, 1960

H. W. TRECHSEL 2,952,500

ANALOG SIMILATOR

Filed June 20, 1956

INVENTOR.
Hans Werner Trechsel
BY
ATTORNEYS.

Sept. 13, 1960     H. W. TRECHSEL     2,952,500
ANALOG SIMILATOR
Filed June 20, 1956     4 Sheets-Sheet 4

INVENTOR.
Hans Werner Trechsel
BY
ATTORNEYS.

United States Patent Office 2,952,500
Patented Sept. 13, 1960

2,952,500

ANALOG SIMILATOR

Hans Werner Trechsel, Madison, Wis., assignor to Gisholt Machine Company, Madison, Wis., a corporation of Wisconsin Filed June 20, 1956, Ser. No. 592,528

16 Claims. (Cl. 346—17)

This invention relates to an analog similator, and more particularly to a mechanical analog similator for recording data on a control record or the like.

Such records are used to control movements of machine tools and the like, and can put the machines through entire work cycles or series of cycles without the need for human attention. This procedure, commonly called "automation," has been gaining wide acceptance in many manufacturing fields.

Heretofore, the production of the control records has been accomplished by means of electronic digital computers or similators. This method has proved very costly and time consuming in that a system of coding is used instead of the decimal system. An older method of recording involved putting a machine through the desired cycle while simultaneously recording the actual physical displacements which have occurred. This took the machine out of production while recordings were being made and required a substantial amount of additional equipment to be installed on the machine for recording purposes.

The present invention provides an analog similator which records the desired cycle on a tape or other control record independent of the machine to be controlled. The recording may be made from a suitable master blueprint by an operator completely unfamiliar with the machine itself, and can be as accurate as desired. No coding is necessary.

The accompanying drawings illustrate the best mode presently contemplated by the inventor for carrying out the invention.

Figure 1:
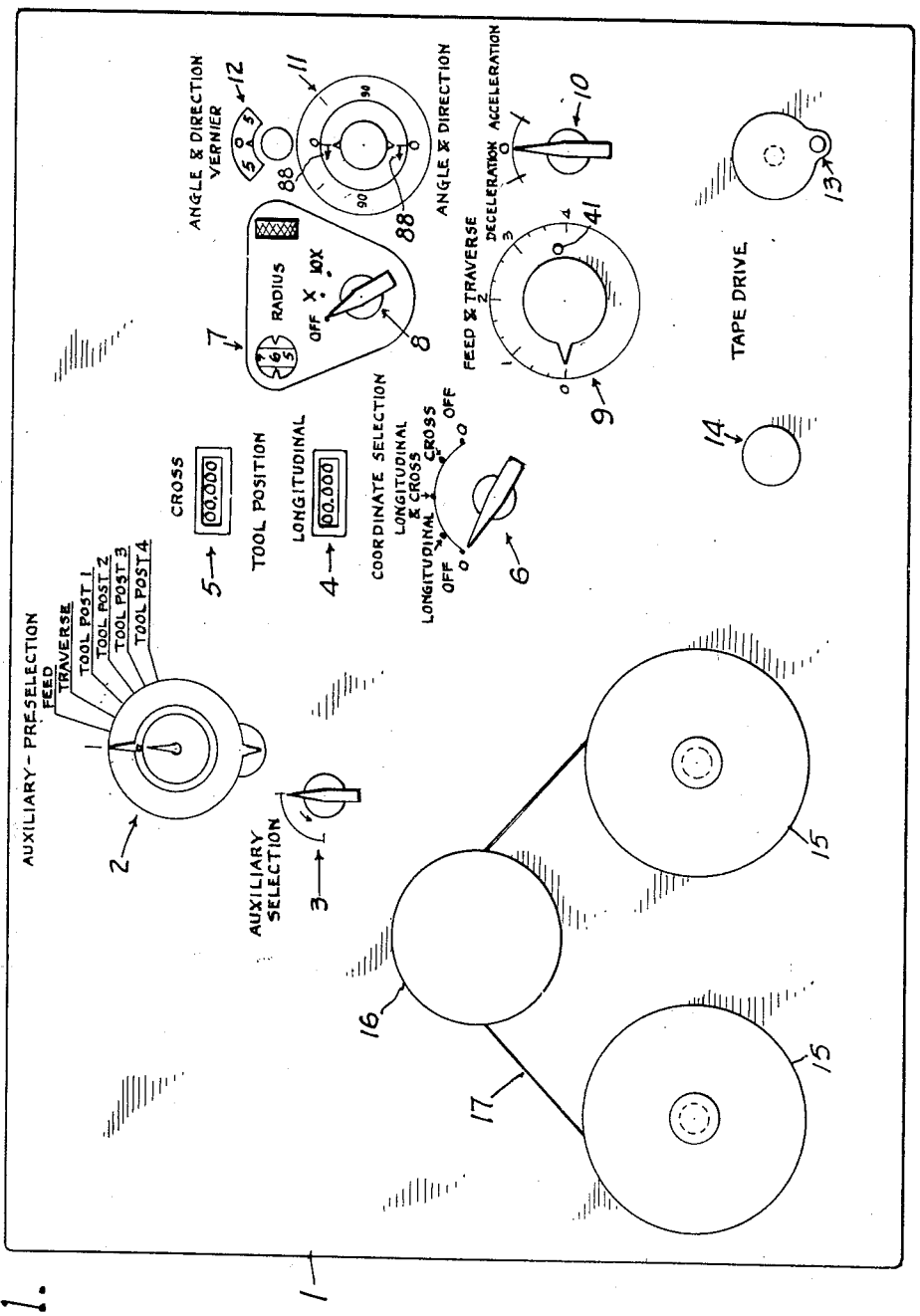
Figure 1 is a front elevation of a control panel utilized for operating the analog similator.

As shown in Fig. 1 of the drawings, the analog similator may be housed in a suitable casing having a front panel 1 on which are mounted a plurality of dials and switches. These comprise: an auxiliary preselection dial 2, an auxiliary selection switch 3, an X or longitudinal coordinate counter 4, a Y or cross coordinate counter 5, a coordinate selection switch 6, a radius dial 7, a radius switch 8, a feed and traverse dial 9, an acceleration-deceleration control switch 10, an angle and direction dial 11 and a vernier dial 12. In addition, a manual drive knob 13 and a motor drive switch 14 is provided. The dials and switches are designed for manual manipulation to control the apparatus within the casing for recording purposes.

A suitable tape recording mechanism is disposed on panel 1 and comprises a pair of tape take-up reels 15 and a recording head 16 disposed therebetween. Reels 15 are rotatably driven in a manner to be described to pass a multiple track tape 17 through head 16 for receiving recordable impulses therefrom. Tape 17 is preferably magnetic in nature, although other suitable types may be used, such as those disclosed in Neergaard Patent No. 2,628,539, dated February 17, 1953. Each track on tape 17 receives separate impulses from head 16.

Figure 2:
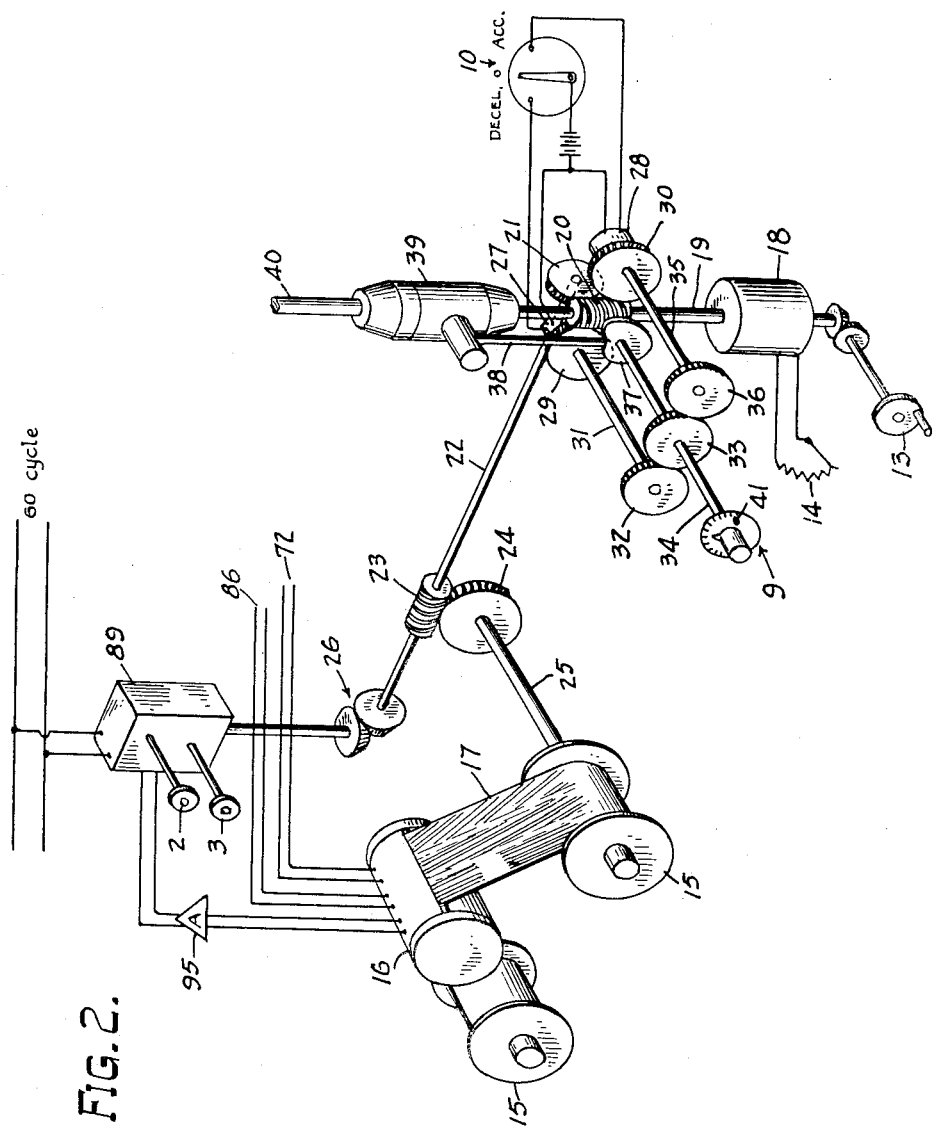
Fig. 2 is a schematic perspective view of the lower portion of the similator.

As shown in Fig. 2, the similator drive comprises a motor 18 which may be energized electrically through switch 14 or operated manually through handle 13. The rotating output of motor 18 comprises a vertical drive shaft 19. A worm 20 is secured to shaft 19 adjacent motor 18 and engages a worm gear 21 which is disposed centrally on a horizontal shaft 22. One portion of shaft 22 has a worm 23 thereon which meshes with a worm gear 24 on a tape magazine windup drive shaft 25. Another portion of shaft 22 is connected through suitable bevel gears 26 to the auxiliary selection mechanism.

A pair of solenoid clutches 27 and 28 are disposed on opposite sides of worm 20 and have worm gears 29 and 30 respectively which mesh therewith. A drive shaft 31 is secured at its inner end within clutch 27 and passes outwardly and freely through gear 29. The outer end of shaft 31 has a gear 32 adapted to mesh with a gear 33 on centrally disposed shaft 34. A drive shaft 35 is secured at its inner end within clutch 28 and passes outwardly and freely through gear 30. A gear 36 is mounted on the outer end of shaft 35 and is also adapted to mesh with gear 33. Feed dial 9 is disposed on the outer end of central shaft 34.

A heart-shaped cam 37 is mounted on the inner end of shaft 34 and is engaged by a cam follower 38 which is connected to a variable speed changer 39. Vertical drive shaft 19 comprises the input to speed changer 39, while a long vertical drive shaft 40 extends upwardly therefrom and comprises the output thereof. Shaft 40 operates as an extension of drive shaft 19.

When the acceleration-deceleration control switch 10 is set at "0," clutches 27 and 28 are disengaged and turning of shaft 19 at a certain speed via motor 18 or knob 13 will turn output shaft 40 at a fixed speed relative thereto, depending on the position of follower 38 on cam 37. Gears 29 and 30 will turn, but there will be no connection to shafts 31 and 35. The cam setting and therefore the output speed of shaft 40 relative to the speed of shaft 19 is determined by setting the arrow on feed and traverse dial 9.

If acceleration-deceleration control switch 10 is turned to "Deceleration," clutch 27 will be engaged to complete the connection from shaft 19 through gear 29 to shaft 31, and will drive the latter and gear 32 to turn gear 33 and shaft 34 counterclockwise to slowly move cam 37 so that speed changer 39 will reduce the relative rotation between input shaft 19 and output shaft 40. At the same time, the arrow on feed dial 9 will be advanced in the direction of deceleration, counterclockwise in this instance, and there will be no connection between shaft 35 and shaft 19.

If acceleration-deceleration control switch 10 is turned to "Acceleration," clutch 28 will be engaged to complete the connection from shaft 19 through gear 30 to shaft 35, and will drive the latter and gear 36 to turn gear 33 and shaft 34 clockwise to slowly move cam 37 so that speed changer 39 will increase the rotational speed of output shaft 40 relative to the rotational speed of input shaft 19. At the same time, the arrow on feed and traverse dial 9 will be advanced in the direction of acceleration, clockwise in this instance, and there will be no connection between shaft 31 and shaft 19.

The maximum speed and acceleration and deceleration will depend on the shape of cam 37. If it is desired to accelerate to a speed less than the possible maximum, a speed stop 41 may be placed on dial 9 to prevent the dial from turning beyond a certain point. This stopping of dial 9 stops shaft 34 and cam 37 from rotating, and is permitted by making clutches 27 and 28 of the slip type.

Output shaft 40 passes upwardly from variable speed changer 39 for operating the data similating transmission and has a suitable solenoid clutch 42 mounted thereon. Clutch 42 has a driving gear 43 freely mounted on shaft 40 and meshing with a gear 44 mounted at the upper end of a rotatable shaft 45. Shaft 45 passes downwardly into a radius integrator, indicated generally at 46.

Figure 3:
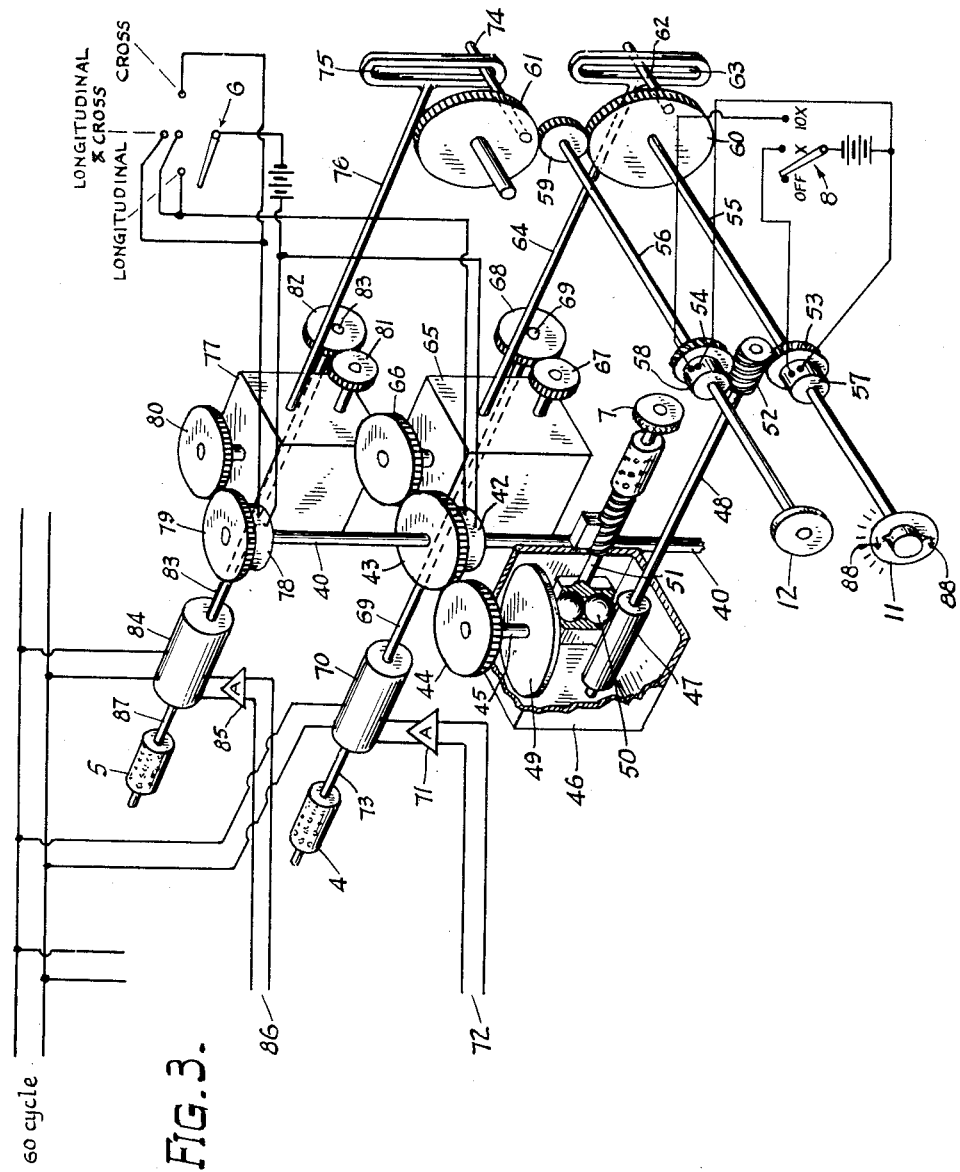
Fig. 3 is a schematic perspective view of the upper portion of the similator and with parts broken away.

As shown in Fig. 3, the integrator 46 comprises a cylinder 47 of a predetermined diameter and length which is rotatably journaled in suitable bearings and has a shaft 48 secured thereto and extending outwardly axially of the cylinder at the other end thereof. A circular disk 49 is disposed on the lower end of shaft 45 and is spaced slightly above the top surface of cylinder 47. Connection between disk 49 and cylinder 47 is provided by a pair of balls 50 disposed vertically in engagement with each other, with the upper ball contacting disk 49 and the lower ball contacting cylinder 47. Balls 50 are suitably secured in a cage disposed on the inner end of a control shaft 51. Radius dial 7 is disposed on the outer end of shaft 51 and is adapted to position the latter linearly.

Clutch 42 is engaged by turning switch 6 to either "Longitudinal" or "Longitudinal-Cross," as will be explained more fully hereinafter. Shaft 40 will drive gear 43 through clutch 42 to rotate gear 44 and shaft 45.

Assuming that clutch 42 is engaged and that shaft 51 is extended and disposed so that balls 50 are adjacent one end of cylinder 47 and adjacent the edge of disk 49, rotation of disk 49 will cause balls 50 to revolve and drive cylinder 47 about its axis. As shaft 51 is moved inwardly, balls 50 will approach the center axis of disk 49 and will gradually revolve slower until, at the center, there will be no movement. The speed of cylinder 47 will therefore also decrease to zero. If balls 50 are moved past the center axis of disk 49, the direction of rotation of the latter will reverse and its speed will gradually increase. The direction of rotation of cylinder 47 and shaft 48 will follow accordingly.

Linear control of the position of shaft 51 will thereby control the speed and direction of rotation of shaft 48 through cylinder 47. The position of balls 50 on one side or the other of the axis of disk 49 will determine whether a clockwise or counterclockwise movement is to be similated. The gradations on radius dial 7 may therefore be separated into clockwise and counterclockwise radii.

The integrator 46 actually takes the combination of a rotary motion and a variable linear position and translates them into a fixed or variable rotary motion.

The outer end of control shaft 51 is secured to the radius selector dial 7 which, when turned, moves shaft 51 to control the speed and direction of rotation of shaft 48. When dial 7 is set at infinity, indicating an infinite radius which is a straight line, balls 50 will be on the axis of disk 49 and shaft 48 will not rotate when shaft 45 rotates. If switch 6 is turned to either "Off" position or the "Cross" position, clutch 42 will not be engaged and integrator 46 will not operate.

As best shown in Fig. 3, a worm 52 is mounted on the outer end of shaft 48, and meshes with a pair of worm gears 53 and 54 which are freely mounted on shafts 55 and 56 respectively. Gears 53 and 54 form part of suitable solenoid clutches 57 and 58 respectively, the latter receiving the inner end portions of shafts 55 and 56 respectively. A pinion 59 is mounted on the outer end of shaft 56 and meshes with a lower pin drive gear 60 and an upper pin drive gear 61.

Lower gear 60 is mounted on the inner end portion of shaft 55 and is adapted to rotate therewith. A pin 62 is mounted on gear 60 at a predetermined distance from the axis thereof, with the outer end of the pin adapted to ride in a vertical slot 63 disposed in the end of a linearly positionable control shaft 64 which provides the linear input for an X-coordinate integrator 65, substantially identical to integrator 46. The rotational input of integrator 65 is supplied through a gear 66 which meshes with clutch gear 43 and is connected to shaft 40 when clutch 42 is engaged. The rotational output of integrator 65 is connected through gears 67 and 68 to a shaft 69 which is the mechanical input to a suitable transducer for varying electrical signals, such as resolver or phase shifter 70.

Resolver 70 may be adapted to receive an alternating current of, say, 60 cycles, through a suitable power line. When no rotational input is supplied by shaft 69, resolver 70 will transmit the 60 cycle current unchanged to an amplifier 71. Rotation of shaft 69 will be proportionately transduced or translated by resolver 70 to alter the frequency of the current supplied and send the altered current to amplifier 71. The amount and direction of frequency change, either above or below the frequency input, will depend on the speed and direction of rotation of input shaft 69.

Amplifier 71 amplifies the signal received from resolver 70 and sends it on through leads 72 to the recording head 16 which records the information on a tape track. Any change in frequency of the signal will produce a shift or displacement of the track in relation to the direction of movement of the tape 17.

The mechanical output of resolver 70 comprises an extension of input shaft 69, indicated as shaft 73. Shaft 73 actuates X-coordinate counter 4, adapted for visually indicating displacements.

Upper gear 61 is mounted on a suitable shaft, and a pin 74 is mounted on gear 61 in a manner similar to the mounting of pin 62 on gear 60, with the outer end of the pin adapted to ride in a vertical slot 75 disposed in the end of a linearly positionable control shaft 76 which provides the linear input for a Y-coordinate integrator 77, similar to integrators 46 and 65. The rotational input of integrator 77 is supplied through a solenoid clutch 78 mounted on shaft 40. Clutch 78 is controlled by coordinate selection switch 6 and serves to connect a clutch gear 79 to vertical shaft 40 to drive a gear 80 meshing with gear 79. Gear 80 is mounted on the input shaft for integrator 77. The rotational output of integrator 77 is connected through gears 81 and 82 to a shaft 83 which is the mechanical input to a suitable transducer for varying electrical signals, such as resolver or phase shifter 84.

Resolver 84 may receive an alternating current from a suitable power line and transmit the current, either changed or unchanged to an amplifier 85 and hence through leads 86 to head 16. The mechanical output of resolver 84 comprises an extension of shaft 83, indicated as shaft 87. Shaft 87 actuates Y-coordinate counter 5, adapted for visually indicating displacements.

Resolvers 70 and 84 produce changes in frequency caused by mechanical movement, and illustrate only one form of transducer. Other transducers, such as those utilizing coding, could be used.

Energization of clutch 57 will complete the connection between gear 53 and shaft 55 which will rotate lower pin drive gear 60, which in turn will rotate upper pin drive gear 61 through pinion 59. Energization of clutch 58 will complete the connection between gear 54 and shaft 56 which will rotate pinion 59, which in turn will rotate pin drive gears 60 and 61.

The ratio of pin drive gears 60 and 61 to pinion 59 is ten to one. Assuming that clutches 57 and 58 will be operated at the same speed, engaging of clutch 57 will cause gears 60 and 61 to rotate ten times faster than if clutch 58 is engaged.

The above ratio permits the use of a single scale on radius dial 7. For example, a reading of ".2" on dial 7 might normally mean two tenths of an inch (.2"). By turning switch 8 to "X" to engage clutch 57, a .2" radius will be recorded. However, the reading of ".2" on dial 7 could also be used to produce a two inch radius by turning switch 8 to "10X" which will engage clutch 58 instead.

Angle and direction dial 11 is disposed on shaft 55 adjacent clutch 57, while vernier dial 12 is disposed on shaft 56 adjacent clutch 58. Since shafts 56 and 55 will always rotate in a ten to one ratio, vernier dial 12 will provide a fine adjustment control for dial 11.

The combination of pin drive gear 60, pin 62, slot 63 and control shaft 64 is in effect a generator of simple harmonic motions, shown in this instance as a scotch yoke adapted to generate a cosine wave. The combination of pin drive gear 61, pin 74, slot 75 and control shaft 76 is also shown as a scotch yoke type simple harmonic motion generator, but adapted to generate a sine wave. Gears 60 and 61 are connected by pinion 59 so that their respective generators operate in synchronization with each other and so that pins 62 and 74 are always 90° out of phase.

When the arrows 88 on dial 11 face either left or right horizontally, indicating that movement is to be on or parallel to the X axis only, pin 74 will lie in the vertical plane passing through the center of pin drive gear 61. At this position, the rotational output of integrator 77 will be zero during recording. At the same time, pin 62 will lie in the horizontal plane passing through the center of pin drive gear 60, and the rotational output of integrator 65 will be at a maximum. Y-resolver 84 will be producing no frequency change in the alternating current while X-resolver 70 will be producing a maximum frequency change for recording purposes.

When arrows 88 face either up or down vertically, indicating that movement is to be on or parallel to the Y axis only, pin 74 will lie in the horizontal plane passing through the center of pin drive gear 61 and the rotational output of integrator 77 will be at a maximum during recording. At the same time, pin 62 will lie in the vertical plane passing through the center of pin drive gear 60, and the rotational output of integrator 65 will be zero. Y-resolver 84 will be producing a maximum change of frequency in the alternating current while X-resolver 70 will be producing no frequency change for recording purposes.

When a portion of the controlled machine, such as a cutting tool, is to be moved on or parallel to the X axis longitudinally, there will be no change in the Y coordinate. Similarly, when a tool is to be moved on or parallel to the Y axis (transverse or cross), there will be no change in the X coordinate. This information is transferred to tape 17 by a change or lack of change in the frequency signal passing through amplifiers 71 and 85.

When X coordinate motion only is to be recorded, angle and direction dial 11 is set with arrows 88 pointing horizontally, coordinate selector switch 6 is turned to "Longitudinal," which engages clutch 42 to operate X integrator 65, while clutch 78 for Y integrator 77 remains disengaged. Although engagement of clutch 42 will also connect radius integrator 46 with shaft 40, there will be no effect on the operation of the simulator since radius switch 8 will be at the "Off" position when a straight line motion is desired and clutches 57 and 58 will therefore be disengaged. When Y coordinate motion only is to be recorded, angle and direction dial 11 is set with the arrows 88 pointing vertically, coordinate selector switch 6 is turned to "Cross," which engages clutch 78 for Y integrator 77, while clutch 42 for X integrator 65 remains disengaged.

To provide a straight angle motion, such as for chamfering, switch 6 is turned to "Longitudinal-Cross" which engages clutches 42 and 78 to operate their respective integrators 65 and 77. Radius switch 8 is set at "Off." Arrows 88 on dial 11 are set to point at the desired angle and direction, which will set the integrators 65 and 77 accordingly. Vernier dial 12 may be used to provide a fine setting of dial 11. This setting may provide more change of the X coordinate than the Y coordinate, or the reverse. For a 45° angle, the relative displacements of the X and Y coordinates would be equal for any given distance.

When it is desired to have a curved motion, such as in cutting a radius on a workpiece, switch 6 is again set at "Longitudinal-Cross" so that integrators 46, 65 and 77 will operate. Dial 11 is set at the initial desired angle. In this instance, however, clutch 57 or 58 is engaged by turning switch 8 to "X" and "10X." Radius dial 7 is set at the proper clockwise or counterclockwise radius desired, which will control the rotational output of radius integrator 46, said output being synchronized with the rotation of shaft 40. When shaft 40 is turned, pin drive gears 60 and 61 will gradually rotate to produce linear displacements of control shafts 64 and 76 which will vary the rotational outputs of integrators 65 and 77 to produce the desired radius.

The auxiliary selector mechanism 89 is connected through bevel gears 26 and may be of any suitable type and is indicated only generally.

The rate of displacement of the recording tracks is governed by the cam-controlled variable speed changer 39. Recorded acceleration or deceleration of movement along the X or Y coordinates, or both, and the rates of constant speed motion are controlled by the position and movement of cam 37.

The rate of rotation of shaft 19 will under all circumstances control the rate at which information is transmitted through resolvers 70 and 84 and amplifiers 71 and 85 to tape 17, depending on the settings of the various control dials and switches. In addition, the rate of rotation of shaft 19 will control the feed rate for tape 17. It therefore makes no difference at what speed tape 17 is driven, nor does it make any difference if the drive speed varies, as will be the case when manual knob 13 is used for recording. A faster tape drive speed will result in a faster rate of change of frequency output of resolvers 70 and 84. The recording operator can slow, stop or speed up the tape at any time without in any way affecting the information transferred to the tape.

Figure 4:
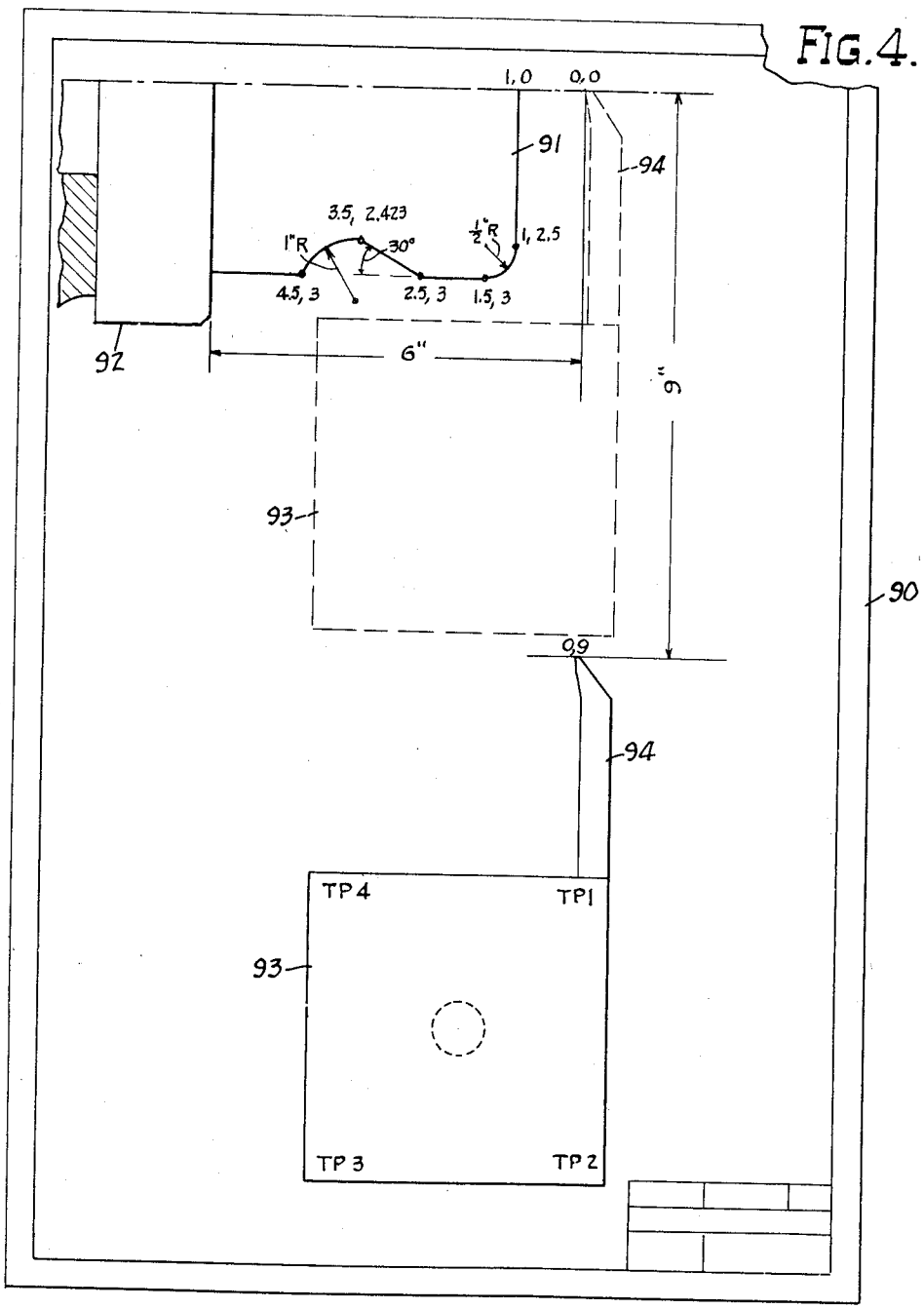
Fig. 4 is a reproduction of a blueprint showing a workpiece to be machined by utilizing a control record produced by the similator.

The blueprint 90 shown in Fig. 4 shows a workpiece 91 which is to be machined on a lathe controlled by a recording produced with the analog similator. The dimensions of workpiece 91 are given. A part of a lathe spindle 92 is shown in blueprint 90 with workpiece 91 suitably secured thereto. In addition, a turret-type tool post 93 is shown which would correspond to a suitable tool post on the lathe. Tool post 93 is shown as having four tool stations, indicated as TP1, TP2, TP3 and TP4. For purposes of illustration, a tool 94 is shown secured at station TP1 only, although suitable tools could be secured at the other stations. It will be assumed that tool 94 is an all-purpose cutting tool capable of machining workpiece 91 to the desired form.

In order to produce a plurality of identical workpieces, it is necessary to provide an arbitrary point of reference on the lathe, indicated in Fig. 4 as 0,0. This point is shown as located on the longitudinal axis of spindle 92 and six inches from the outer face of the spindle head. It may, of course, be located otherwise to accommodate the particular workpiece and machining operation. It will be assumed that the 0,0 point indicates 0 on an X axis and 0 on a Y axis with the latter perpendicular to the X axis and with the axes disposed in a horizontal plane, in this instance containing the axis of spindle 92. It will also be assumed that this reference point will lie on the longitudinal axis of workpiece 91 and one inch beyond the outer face thereof. All measurements and movements are measured in relation to this point.

For identical finished parts, the tip of tool 94 must be at exactly the same starting position each time. This point may also be arbitrary, and is identified on blueprint 90 as the point 0,9.

The starting position of tool 94 must be transferred to tape 17, and may be introduced by making suitable dial settings in a manner similar to that described hereinafter and then using knob 13 or motor switch 14 to actuate the similator until longitudinal counter dial 4 reads 00.000 and cross counter dial 5 reads 09.000. This reading should preferably be introduced into the similator when no tape 17 is threaded through the recording head 16, for only the starting point need be placed on the tape. If the final position in the preceding tape recorded was 0,9 the information would already be in the similator and no additional steps need be taken.

Assume that it is desired to move tool 94 so that it initially contacts workpiece 91 at the coordinate point 1,0. The first motion will be to reach the point 0,0. This will require only a lateral or transverse motion. The coordinate selector 6 is switched to "Cross." The angle direction dial 11 is set at 90° and so that the clockwise and counterclockwise arrows 88 thereon point in the direction of movement desired, in this instance transversely upwardly.

During traverse, as contrasted with feed, a plurality of servo controls are used to move tool post 93 in response to the recorded information. Sudden displacements in the recorded tape track would prevent proper response in the servo system, especially when the track displacement is at right angles to the direction of movement of the tape. Since the desired traverse speed of the machine may be as much as 10 times the feed speed, sudden shifts may occur in starting and stopping of machine movement which will make it very difficult for the servo mechanisms to follow. To avoid this problem, acceleration at the beginning and deceleration at the end of the movement are provided, which will reduce the sharpness of the angle of the displacement of the tape tracks. The acceleration-deceleration control switch 10 is therefore switched to "Acceleration," and feed dial 9 is set at 0 feed. A maximum rate of speed may be desired after acceleration has taken place, and this is accomplished by placing speed stop 41 adjacent the desired speed number on feed and traverse dial 9. Since the motion desired is straight line motion, radius switch 8 is set at the "Off" position, and also radius dial 7 is set at infinity, if desired.

Tape drive knob 13 is now turned, or switch 14 is utilized to energize motor 18 to actively drive shaft 19. With the above described settings, clutch 78 will operate to actuate Y integrator 77, and the output of the latter will be transferred to resolver 84 to change the frequency output of the latter for transmission to amplifier 85 and through leads 86 to head 16. Turning of shaft 19 will effect linear translation between head 16 and tape 17 in a continuous manner. As tape 17 passes through head 16 and is recorded with the proper information, clutch 27 will turn shafts 31 and 34 to turn cam 37 clockwise and gradually and continuously increase the output speed of variable speed changer 39. At the same time, feed dial 9 will increase from 0 speed upwardly until speed stop 41 is engaged. From this point on there will be no turning of cam 37 and no acceleration, since clutch 27 is of the slip type.

Since X-resolver 70 is not being operated, longitudinal counter 4 will continue to read 00.000; but Y-resolver 84 is operating and will gradually decrease the reading of cross counter 5. When the reading of counter 5 is slightly over 00.000, the tape is stopped. The distance left to go to reach the coordinate point 0,0 is necessary to provide deceleration. This distance might be .1 inch, so counter 5 will now read 00.100.

Switch 10 is now turned to "Deceleration" and the tape 17 is again moved by knob 13 or other means until counter 5 reads 00.000.

During the deceleration period, clutch 27 will be disengaged and clutch 28 will be engaged to turn shafts 35 and 34 to turn cam 37 counterclockwise and gradually and continuously decrease the output speed of variable speed changer 39. At the same time, feed and traverse dial 9 will move back to 0. Dial 9 indicates the degree of acceleration or deceleration at any given instant.

The tape is now recorded to the point where tool 94 has reached the coordinates 0,0. It is now desired to move the tool from 0,0 to 1,0 which is the starting point for machining. Coordinate selector 6 is switched to "Longitudinal" which engages clutch 42. The angle direction dial 11 is set at 0° so that arrows 88 point in the direction of movement desired, in this instance longitudinally to the left as shown on the blueprint 90. Acceleration-deceleration control switch 10 is switched to "Acceleration" and speed stop 41 may again be placed adjacent the desired speed number on feed and traverse dial 9. Radius switch 8 is set at the "Off" position, and radius dial 7 may be set at infinity if desired.

Knob 13 or switch 14 is again utilized to turn drive shaft 19. With the above described settings, clutch 42 will operate to actuate X integrator 65, and the output of the latter will be transferred to resolver 70 to change the frequency output of the latter for transmission to amplifier 71 and through leads 72 to head 16 and tape 17. The acceleration mechanism will operate as described above.

Since Y-resolver 84 is not being operated, cross counter 5 will continue to read 00.000; but resolver 70 is operating and will gradually increase the reading of longitudinal counter 4. The deceleration is provided in a manner similar to that described above and tape 17 is moved until longitudinal counter 4 reads 01.000. The tape is now recorded to the point where tool 92 has reached the coordinates 1,0. Machining of the workpiece itself is now ready to be recorded.

As indicated by blueprint 90, the first machining desired is a lateral straight line cut starting at the coordinates 1,0 and ending at 1, 2.5. To record this cut, the coordinate selector 6 is switched to "Cross" which engages clutch 78. Angle direction dial 11 is set at 90° and so that arrows 88 point in the direction of movement desired, in this instance laterally downward. Vernier dial 12 may be utilized. Radius switch 8 is set at "Off." Since the machining operations constitute slow feed speeds instead of relatively fast traverse speeds, acceleration-deceleration control switch 10 is turned to "0" so that neither clutch 27 nor 28 will be engaged.

Drive shaft 19 is now turned by knob 13 or motor switch 14, and the similator will record the proper information on tape 17 in a manner similar to that for recording the first traverse sequence. When cross counter 5 reads 02.500 recording is stopped. Longitudinal counter 4 will still read 01.000.

As shown in blueprint 90, it is next desired to machine a clockwise convex curved path having a radius of ½ inch beginning at coordinate point 1, 2.5 and curving in a clockwise direction to point 1.5, 3. Since both the X and Y coordinates will be affected in recording this cut, coordinate selector switch 6 is turned to "Longitudinal-Cross" which energizes clutches 42 and 78. Since the direction of cutting of the radius is clockwise, angle selection dial 11 is set so that the clockwise pointing arrow 88 is pointing in the direction of the beginning of the cut, 90° downwardly in the instance. Acceleration-deceleration control switch 10 is set at the "0"

position. Feed and traverse dial 9 is set at the desired speed, say "4."

Radius switch 8 then may be turned to the "X" or full scale position, thereby energizing clutch 57 which completes the connection between radius integrator 46 and pin drive gears 60 and 61. Radius dial 7 may be set at ".5" on the clockwise gradations which indicates a .5 inch radius in the "X" position. This controls the input setting of integrator 46 through shaft 51.

When drive shaft 19 is turned, clutch 42 will operate integrator 46 which will turn pin drive gears 60 and 61 through rotating shaft 48 and clutch 57. Rotation of gears 60 and 61 will vary the inputs and outputs of integrators 65 and 77 to thereby change the frequencies passing through resolvers 70 and 84 to amplifiers 71 and 85 and head 16. In this instance, the input settings of integrators 65 and 77 will produce increasing outputs, causing both coordinate readings to increase. Angle and direction dial 11 will rotate clockwise on shaft 55, and when arrows 88 are pointing longitudinally to the left the longitudinal X counter 4 will read 01.500 and the cross Y counter 5 will read 03.000 to give the required coordinate reading of 1.5, 3. The drive mechanism is then stopped.

Recording of the longitudinal cut from 1.5, 3 to 2.5, 3 is accomplished in a manner similar to that described above in regard to the second traverse step, with switch 10 turned to "0" at all times. At the completion of this step, counter 4 will read 02.500 and counter 5 will read 03.000.

The next portion of the machining operation is a 30° chamfer cut, starting at point 2.5, 3 and extending until the X coordinate is 3.5 Switch 6 is again turned to "Longitudinal-Cross," which will engage clutches 42 and 78. Angle direction dial 11 is set at 30° so that arrows 88 point in the direction of movement desired, thereby providing a fixed setting for pin drive gears 60 and 61 and integrators 65 and 77 respectively. Acceleration-deceleration control switch 10 is switched to "0." Since the cutting of a chamfer requires no radius, radius switch 8 is set at the "Off" position, and radius dial 7 may be set at "infinity" if desired. Feed and traverse dial 9 is set at the desired feed speed, say "4."

Drive shaft 19 is again turned by knob 13 or through switch 14 and motor 18. With the above described settings, clutches 42 and 78 will operate to actuate their respective integrators 65 and 77. In this instance, the input setting of 30° for integrators 65 and 77 will produce outputs causing the X coordinate reading to increase and the Y coordinate reading to decrease. The outputs of the X and Y integrators will be transferred to resolvers 70 and 84 to effect the signal passing through amplifiers 71 and 85 to tape 17. Drive shaft 19 may be turned until longitudinal counter 4 reads 03.500, in which instance cross counter 5 will read 02.423. The latter reading is the tangent of 30° when the adjacent side of the right triangle equals 1.

Counters 4 and 5 will reach their proper respective readings at approximately the same time since they are directly connected to resolvers 84 and 70, respectively. By reading longitudinal counter dial 4 only, the length of chamfer can be very accurately controlled. If it is desired to have an extremely accurate depth of chamfer, cross counter dial 5 would be read instead. In the example, the depth of chamfer desired would be .077 inch, so the tape drive could be stopped when dial 5 reads 02.423. Any slight variation of dial 4 from 03.500 would be in thousandths of an inch.

For purposes of explanation, it will be assumed that counter 5 reads exactly 02.423 and counter 4 reads exactly 03.500.

As shown in blueprint 90, it is last desired to cut a concave one inch counterclockwise radius beginning with 3.5, 2.423 and ending at 4.5, 3. Since both axes will be affected, coordinate selector switch 6 will remain at the "Longitudinal-Cross" position. Since the direction of cutting of the radius is in this instance counterclockwise, angle selector dial 11 is set so that the counterclockwise arrow 88 is pointing in the direction of the beginning of the radius, longitudinally to the left in this instance. Acceleration-deceleration control switch 10 remains at the "0" position. Feed dial 9 is set at the desired speed, say "4."

In this instance a concave radius is to be cut. Radius switch 8 then may be turned to the "10X" position, thereby energizing clutch 58 which completes the connection between integrator 46 and pin drive gears 60 and 61. Radius dial 7 is set at ".1" on the counterclockwise gradations which controls the input setting of radius integrator 46.

When drive shaft 19 is turned, clutch 42 will operate integrator 46 which will turn pin drive gears 60 and 61 through shaft 48 and clutch 58. At the same time, dial 11 will rotate counterclockwise on shaft 55. Rotation of pin drive gears 60 and 61 will vary the outputs of integrators 65 and 77 respectively. The outputs of integrators 65 and 77 will affect the outputs of their respective resolvers, 70 and 84 which pass to amplifiers 71 and 85 and hence to tape 17. The rotation of drive shaft 19 will rotate dial 11 on shaft 55, and when arrows 88 are pointing downwardly at the proper angle the longitudinal counter 4 will read 04.500 and the cross counter 5 will read 03.000 to give a coordinate reading of 4.5, 3. The drive mechanism is then stopped.

Additional cuttings may be recorded for tool movement as may be required. Recording of these movements may be accomplished in a manner similar to those described above by making the proper settings on the control panel.

After completion of recording of the actual machining of workpiece 91, the tape may be recorded to return tool 94 to the starting point 0,9.

In all radius cuts, the setting of the radius dial 7 must be corrected to compensate for the radius of the tool point. However, for purposes of illustration, the tool point will be considered theoretically infinitely small and having no curvature.

Although only angles show up on angle and direction dial 11, the similator translates the angles into sine and cosine functions to obtain the recording. For example, with the X and Y axes intersecting to form a right angle, any point placed relative to these axes can be used to create a right triangle having sides corresponding to the distance of the point from the X and Y axes. The tangent of the angle formed at the point equals $$\frac{A}{B}$$

where A equals the distance from one axis and B equals the distance from the other axis. But since the tangent equals $$\frac{sine}{cosine}, \frac{A}{B} = \frac{sine}{cosine}$$

and the position of the point can be translated into a $$\frac{sine}{cosine} \text{ relation}$$

This is accomplished with the X and Y integrators together with their respective cosine and sine generators.

Any shift of the point, indicating movement relative to the X and/or Y axes, will produce a new value for $$\frac{sine}{cosine}$$

which will be translated by the analog similator into changes in electrical signals for recording on the control record.

The auxiliary mechanism 89, not shown in detail except for preselection dial 2 and selection switch 3, may be of any suitable type designated to provide the proper recorded signals for rotation of tool post 93 from one station to another, to start and stop the spindle, for feed and traverse, etc. For this purpose, a separate auxiliary track may be provided on tape 17. The auxiliary mechanism may be connected to the 60 cycle power line and supply the suitable signal through an amplifier 95 to head 16. The signal on the auxiliary track may be recorded simultaneously with the recording of displacements as described above, and may control suitable motors, hydraulic systems and the like.

Although only a tool post turret is described as being controlled by the tape, other turrets or mechanisms could also be controlled thereby. Two sets of similator dials and mechanisms could be utilized for simultaneously recording the movements of two turrets disposed on the same lathe.

The analog similator provides a novel means for similating displacements relative to any desired number of coordinate axes for recording purposes. The similator is compact and highly accurate, and will record at any rate desired, commensurate with the abilities of the operator. Means are provided to vary the rate of rotary motion of drive shaft 40 relative to the rate of linear translation between the tape and recording head. The speed of recording will in no way affect the information transferred to the control record, and the final record will be identical with either fast or slow rates of recording.

The similator operator can make the recording directly from a blueprint, putting the actual dimensions and angles into the similator without the need for coding of any kind.

Various modes of carrying out the invention are contemplated as within the scope of the following claims particularly pointing out and distinctly claiming the subject matter which is regarded as the invention.

I claim:

1. An analog similator for recording a simulation of data from visual dimensional information on a blueprint or the like as for the production of machine tool control records and the like, comprising a recording head, a control record for receiving recordable signals from said recording head, rotary means to effect linear translation between said recording head and said control record, a sine wave generator and a cosine wave generator each having an output member linearly positioned thereby, separate means for integrating the linear position of each said output member with a predetermined rotary motion to provide a separate corresponding variable rotary motion, separate transducer means adapted to receive the variable rotary motion from each said integrating means and to proportionately transduce said last named motion into variations in electrical signals, means to feed said electrical signals to said recording head for separate transfer to said control record, means to drive said rotary means and to supply said predetermined rotary motion for each said integrating means in predetermined correlation with said rotary means, manually operable means controlling said sine and cosine wave generators to provide selective relative positions of each said output member correlative to the direction of desired movement relative to $x$ and $y$ coordinates, and second manually operable means to selectively determine the actuation of each said integrating means whereby said recording may similate the path of movement relative to said coordinates.

2. The apparatus of claim 1 including speed control means to vary the rate of rotary motion of said rotary means relative to the rate of linear translation between said recording head and said control record whereby the movement similated on the control record may be accelerated or decelerated, and manual control means for selectively actuating said speed control means.

3. The apparatus of claim 1 including means to operate said wave generators in synchronization during recording in response to said predetermined rotary motion to vary the position of said output members whereby a curved path may be simulated on the control record, and manually operable radius control means to vary the rate of change of position of said output members whereby the size of said curved path is regulated.

4. The apparatus of claim 1 including speed control means to vary the rate of rotary motion of said rotary means relative to the rate of linear translation between said recording head and said control record whereby the movement similated on the control record may be accelerated or decelerated, manual control means for selectively actuating said speed control means, means to operate said wave generators in synchronization during recording in response to said predetermined rotary motion to vary the position of said output members whereby a curved path may be similated on the control record, and manually operable radius control means to vary the rate of change of position of said output members whereby the size of said curved path is regulated.

5. An analog similator for producing recordings on a control record of displacements relative to a plurality of intersecting axes, comprising a recording head, a control record for receiving recordable signals from said recording head, rotary means to effect linear translation between said recording head and said control record, a plurality of simple harmonic motion generators corresponding in number to the number of intersecting axes with each generator adapted to receive data input and having an output member linearly positioned thereby, separate means for integrating the linear position of each said output member with a predetermined rotary motion to provide a separate corresponding variable rotary motion corresponding to the amount of displacement relative to the corresponding axis, separate transducer means adapted to receive the variable rotary motion from each said integrating means and to proportionately transduce said last named motion into variations in electrical signals, means to feed said electrical signals to said recording head for separate transfer to said control record, means to drive said rotary means and to supply said predetermined rotary motion for each said integrating means in predetermined correlation with said rotary means, manually operable means controlling said harmonic wave generators to provide selective relative positions of each said output member correlative to the direction of desired movement relative to said axes, and second manually operable means to selectively determine the actuation of each said integrating means whereby said recording may similate the path of movement relative to said axes.

6. The apparatus of claim 5 including speed control means to vary the rate of rotary motion of said rotary means relative to the rate of linear translation between said recording head and said control record whereby the movement similated on the control record may be accelerated or decelerated, and manual control means for selectively actuating said speed control means.

7. The apparatus of claim 5 including means to operate said wave generators in synchronization during recording in response to said predetermined rotary motion to vary the position of said output members whereby a curved path may be similated on the control record, and manually operable radius control means to vary the rate of change of position of said output members whereby the size of said curved path is regulated.

8. The apparatus of claim 5 including means actuated by said integrating means for visually indicating the coordinate position being recorded at any given instant.

9. In an analog similator for producing recordings on a control record of displacements relative to X and Y coordinates, a recording head, a control record for receiving recordable signals from said recording head, rotary means to effect linear translation between said recording head and said control record, a manually operable wave generator for receiving data input and having an output member linearly positioned thereby, means for integrating the linear position of said output member with a predetermined rotary motion to provide a variable rotary motion corresponding to the amount of displacement relative to said axis, transducer means adapted to receive the variable rotary motion from said integrating means and to transduce said last named motion into variations in electrical signals, means to feed said electrical signals to said recording head for transfer to said control record, means to drive said rotary means and to supply said predetermined rotary motion for said integrating means in predetermined correlation with said rotary means, manually operable means controlling said wave generator to provide a selective position of said output member correlative to the direction of movement desired relative to said coordinates, and second manually operable means to actuate said integrating means whereby said recording may simulate the path of movement relative to said coordinates.

10. The apparatus of claim 9 including speed control means to vary the rate of rotary motion of said rotary means relative to the rate of linear translation between said recording head and said control record whereby the movement simulated on the control record may be accelerated or decelerated, and manual control means for selectively actuating said speed control means.

11. The apparatus of claim 10 which includes a visual indicator connected to said speed control means and which indicates the degree of acceleration or deceleration at any given instant of recording.

12. The apparatus of claim 10 which includes a visual indicator connected to said speed control means and which indicates the degree of acceleration or deceleration at any given instant of recording, and means associated with said speed control means and said visual indicator to limit the amount of acceleration.

13. The apparatus of claim 9 including means actuated by said integrating means for visually indicating the coordinate position being recorded at any given instant.

14. An analog simulator for producing recordings on a control record of displacements relative to a plurality of intersecting axes, comprising a recording head, a control record for receiving recordable signals from said recording head, rotary means to effect linear translation between said recording head and said control record, a plurality of simple harmonic motion generators corresponding in number to the number of intersecting axes with each generator adapted to receive data input and having an output member linearly positioned thereby, separate means for integrating the linear position of each said output member with a predetermined rotary motion to provide a separate corresponding variable rotary motion corresponding to the amount of displacement relative to the corresponding axis, separate transducer means adapted to receive the variable rotary motion from each said integrating means and to proportionately transduce said last named motion into variations in electrical signals, means to feed said electrical signals to said recording head for separate transfer to said control record, means to drive said rotary means and to supply said predetermined rotary motion for each said integrating means in predetermined correlation with said rotary means, means to operate said generators in synchronization and out of phase with each other, manually operable means controlling said generators to provide selective initial relative positions of each said output member correlative to the direction of desired initial movement relative to said axes, second manually operable means to selectively determine the actuation of each said integrating means whereby said recording may simulate the path of movement relative to said axes, a manually operable member adapted for linear positioning corresponding to a desired curved path to be simulated, means to integrate the combination of said predetermined rotary motion and the linear position of said last named member into a rotary motion, and means to transmit said last named rotary motion to said generators whereby said last named rotary motion controls the rate of change of position of said output members.

15. In an apparatus for recording a similation of data from visual information appearing on a bueprint, instruction sheet or the like to produce records for machine tool control; the combination comprising, a control record, a recording member for producing recordable signals on said control record, drive means to translate said control record relative to said recording member and with said drive means having a separate output means; a transmission connected to said separate output means to be driven thereby, said transmission including angle and direction data similating means; means disposed between said transmission and said recording member to control the latter in accordance with the output of said transmission, adjustable speed control means disposed in said separate output means to control the input to said transmission relative to the speed of translation of the control record, first control means connected to said speed control means for setting the latter for the desired relative speed of the transmission, second control means connected to said first control means to automatically change the setting of said speed control means by said first control means to thereby provide acceleration and deceleration of said transmission relative to the speed of translation of the control record, third control means connected with said angle and direction data similating means for setting the latter to produce a simulation of angle and direction data within said transmission, and fourth control means synchronized with the input to said transmission and connected with said third control means for changing the operation of the latter to provide a simulation of either straight line or radial data.

16. In an apparatus for recording a simulation of data from visual information appearing on a blueprint, instruction sheet or the like to produce records for machine tool control; the combination comprising, a control record, a recording member for producing recordable signals on said control record, drive means operable to translate said control record relative to said recording member in a continuous manner and with said drive means having a separate output means; a transmission connected to said separate output means to be driven thereby, means disposed between said transmission and said recording member to control the latter in accordance with the output of said transmission, adjustable speed control means disposed in said separate output means to control the input to said transmission relative to the speed of translation of the control record, first control means connected to said speed control means for setting the latter for the desired relative speed of the transmission, and second control means to automatically change the setting of said speed control means by said first control means in a continuous manner while said drive means is actively operating said transmission and causing translation of said control record relative to said recording member to thereby provide acceleration and deceleration of said transmission relative to the speed of translation of the control record.

References Cited in the file of this patent
UNITED STATES PATENTS

| | | |
|---|---|---|
| 1,873,126 | Hugershoff | Aug. 23, 1932 |
| 2,163,746 | Courtois-Suffit et al. | June 27, 1939 |
| 2,224,182 | Crooke | Dec. 10, 1940 |
| 2,395,351 | Sohn | Feb. 19, 1946 |
| 2,537,770 | Livingston et al. | Jan. 9, 1951 |
| 2,755,160 | Holmes | July 17, 1956 |
| 2,777,354 | Stickney et al. | Jan. 15, 1957 |
| 2,820,187 | Parsons et al. | Jan. 14, 1958 |
| 2,852,189 | Becker et al. | Sept. 16, 1958 |
| 2,866,506 | Hierath et al. | Dec. 30, 1958 |
| 2,875,390 | Tripp | Feb. 24, 1959 |
| 2,919,969 | Luhn | Jan. 5, 1960 |

UNITED STATES PATENT OFFICE

CERTIFICATE OF CORRECTION

Patent No. 2,952,500                  September 13, 1960

Hans Werner Trechsel

It is hereby certified that error appears in the printed specification of the above numbered patent requiring correction and that the said Letters Patent should read as corrected below.

Column 14, line 53, after "means" insert -- connected to said first control means --.

Signed and sealed this 11th day of April 1961.

(SEAL)
Attest:

ERNEST W. SWIDER                  ARTHUR W. CROCKER

Attesting Officer                  Acting Commissioner of Patents